United States Patent Office 3,620,088
Patented Nov. 16, 1971

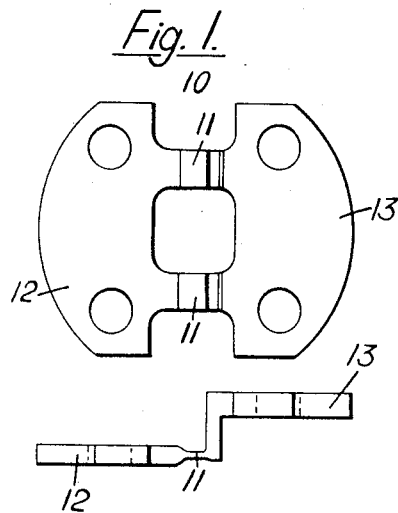
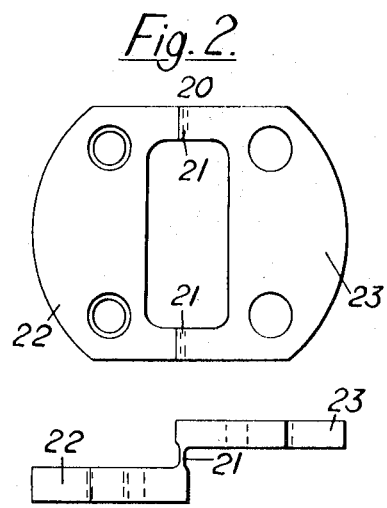
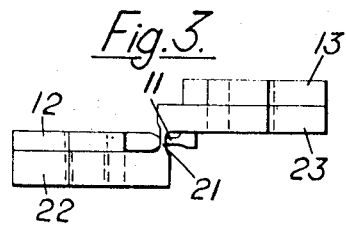
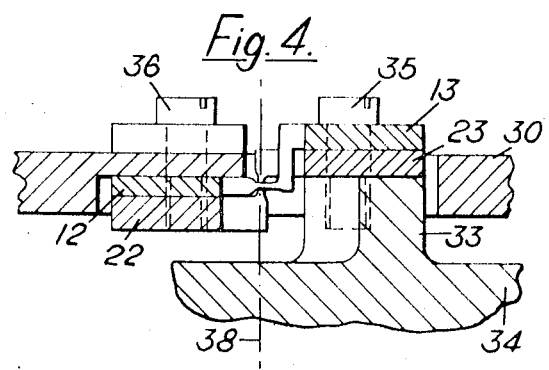
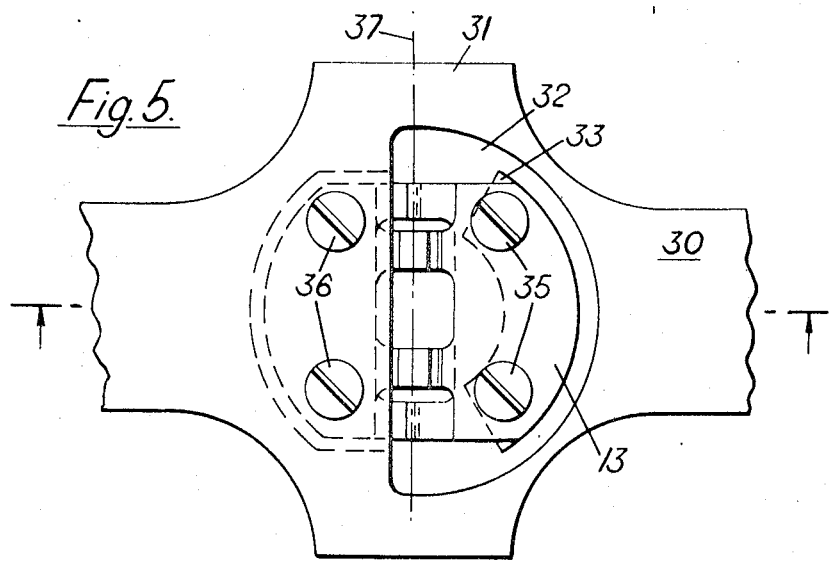

3,620,088
IMPROVEMENTS RELATING TO RESILIENT SUSPENSION MEANS FOR VIBRATING-ROTOR GYROSCOPES
Derek William Alford, Bracknell, England, assignor to Ferranti Limited, Hollinwood, England
Filed Oct. 27, 1969, Ser. No. 869,640
Claims priority, application Great Britain, Nov. 15, 1968, 54,419/68
Int. Cl. G01c 19/18
U.S. Cl. 74—5          9 Claims

ABSTRACT OF THE DISCLOSURE

A suspension for mounting one member for limited rotation relative to another member about a required axis comprises two laminar springs each permitting rotation about a given axis. Each spring is provided with mounting blocks which may be clamped to one another and to the two members so that the given axis of each spring coincides with the required axis and the bending planes of the two springs intersect.

---

This invention relates to means for resiliently supporting a first member for limited rotation about a required axis with respect to a second member.

It is frequently necessary to provide a suspension which supports a first member for rotation about an axis with respect to a second member, and the simplest form of suspension for this purpose is the torsion bar. This allows the necessary limited rotation and provides the necessary restoring torque. However, in certain instances the torsion bar suspension is not suitable; for example it is possible for the bar to bend as well as twist, and the bending may well be undesirable. Although this may be overcome by using a thicker torsion bar, the resilience of the suspension is then reduced.

Vibrating-rotor gyroscopes are known in which an inertial element is resiliently supported for vibration with respect to a rotatable shaft. United States Pat. No. 3,382,726 discloses such a gyroscope having an annular inertial element supported by a pair of torsion members. Such an arrangement suffers from the serious disadvantage that the torsion members are necessarily fairly long and hence are able to bend as well as twist. This lack of rigidity about axes other than the axis of the torsion members is undesirable as it affects the sensors used to detect the position of the inertial member.

One type of suspension commonly used in other applications which has considerable rigidity about axes other than the required bending axis is the crossed-leaf-spring suspension. Many forms of this exist, as described for example in United States Pat. No 3,413,858. However, such suspensions cannot be made with the accuracy of alignment which is essential for this particular application; indeed, in other applications such extreme accuracy is not required.

According to the present invention there is provided a vibrating-rotor gyroscope having an inertial mass located within a casing and having means for resiliently supporting the inertial mass for limited rotation about a required axis with respect to the casing which comprises first and second spring members each comprising at least one laminar spring provided with mounting blocks at each end having matching surfaces for clamping to a corresponding block of the other spring member, each of the first and second spring members permitting rotation about a given axis, the mounting blocks of each spring member being such that when clamped to a mounting block of the other spring member and to the first and second members respectively the laminar of one spring member is positioned with the given axis co-linear with the required axis and in a plane different from that of the other spring member.

Preferably each spring is formed integral with its two mounting blocks.

An embodiment of the invention will now be described with reference to the accompanying drawings in which:

FIGS. 1 and 2 show plan and side elevational views of two laminar springs;

FIG. 3 shows a side elevational view of the assembled suspension; and

FIGS. 4 and 5 show plan and side elevational views of the assembled suspension as used in the vibrating rotor gyroscope.

Referring now to FIG. 1, a first spring member 10 comprises two laminar leaf springs 11 formed integral with two relatively massive mounting blocks 12 and 13. The two mounting blocks have matching surfaces which are parallel to one another and to the plane of the leaf springs 11, the two mounting blocks being laterally displaced from one another as shown. Each block has two holes formed through it for fixing purposes, as will be described later.

A second spring member 20 is shown in FIG. 2. This also comprises a pair of laminar leaf springs 21 formed integral with two relatively massive mounting blocks 22 and 23. The two mounting blocks have matching surfaces which are parallel to one another and perpendicular to the plane of the leaf springs 21, and the two mounting blocks are laterally displaced from one another. Each block has two holes formed through it, the holes through mounting block 22 being tapped holes.

The two leaf springs 11 on the first spring member 10 are set-in from the edge of the mounting blocks 12 and 13, whereas the two leaf springs 21 on the second spring member 20 are located adjacent to the edges of the mounting blocks 22 and 23. The two spring members are of the same overall dimensions so that the two may be placed with their mounting blocks in contact as shown in FIG. 3. When assembled in this manner the upper matching surfaces on the mounting blocks 22 and 23 are in contact with the lower matching surfaces on the mounting blocks 12 and 13. The two pairs of leaf springs cross on a common axis, and this is the axis about which the suspension is resilient.

FIGS. 4 and 5 show the suspension attached to the two relatively rotatable members, parts only of which are shown. The inertial element 30 is a bar-shaped member having an enlarged centre portion 31. In this enlarged portion is a semi-circular cut-out 32 into which projects a post 33 extending from the casing 34 which encloses the inertial element 30. The suspension is attached at one end to the post 33 by means of two screws 35 passing through the mounting blocks 13 and 23 into tapped holes in the post 33. Similarly, the other end of the suspension is attached to the inertial element 30 by means of two screws 36 passing through a recessed portion of the inertial element 30 and the mounting block 12 into tapped holes in the mounting block 22.

When the casing and inertial element are attached to one another by the suspension in this manner, the inertial element is able to pivot, to a limited extent, about the axis 37 (FIG. 5) passing through the intersections of the pairs of leaf springs. No other movement of the inertial element relative to the casing is possible, though the casing itself rotates about the spin axis 38 (FIG. 4). In the vibrating rotor gyroscope the centre of mass of the inertial element is preferably located on the axis of rotation.

This form of suspension has a number of important features which make it particularly suitable for the application described above. The plane of the mounting surface of the crossed leaf-springs may be arranged to be orthogonal to the pivot axis 37 and to pass through the centre of gravity of the inertial element. This avoids any shift of the centre of gravity relative to the pivot axis due to the build-up of a linear temperature gradient along the leaf springs, and also due to differential thermal expansion of the spring and inertial element materials. A further feature is that the suspension may be made so that it is equally elastic in all directions transverse to the pivot axis. This is achieved by making the section of both leaf springs symmetrical.

Any misalignment of the pairs of leaf springs due to variations in the thickness of one or more of the mounting blocks causes bending of the springs about the pivot axis 37, and such bending is easily accommodated. Other stresses are largely eliminated by the manner in which the suspension is attached to the two rotatable members, the holes in the mounting blocks permitting slight movement during assembly. An important advantage of forming the leaf springs integral with the mounting blocks is that the profile and dimensions of the leaf springs and mounting blocks may be closely controlled.

The leaf springs and mounting blocks need not be formed as an integral structure, though for the reasons given above this is to be preferred. However, it is possible to produce mounting blocks having slots into which the ends of separate leaf springs may be secured.

Two bodies may be supported for relative rotation by two spring members each having only a single leaf spring. However, greater rigidity is imported to the suspension if each spring has two leaf springs as described above. A greater number of leaf springs may be used on each spring member if desired.

In the suspension described above, the leaf springs are in a plane either parallel to or perpendicular to the matching surfaces of the mounting blocks. The angular arrangement of the leaf springs relative to the mounting blocks may be varied, and the two leaf springs of the two spring members need not be perpendicular to one another, though this is to be preferred.

What I claim is:

1. A vibrating rotor gyroscope having an inertial mass located within a casing and having means for resiliently supporting the inertial mass for limted rotation about a required axis with respect to the casing comprising first and second spring members each comprising at least one laminar spring provided with mounting blocks at each end having matching surfaces for clamping to a corresponding block on the other spring member, each of the first and second spring members permitting rotation about a given axis, the mounting blocks of each spring member being such that when clamped to the mounting blocks of the other spring member and to the inertial mass and the casing respectively the laminar spring of one spring member is positioned with the given axis co-linear with the required axis and in a plane different to that of the laminar spring of the other spring member.

2. A gyroscope as claimed in claim 1 in which the mounting blocks and spring members are arranged such that when the mounting blocks are clamped together the planes of the laminar springs of the first and second spring members are mutually perpendicular.

3. A gyroscope as claimed in claim 1 in which a pair of mounting blocks carries a plurality of laminar springs.

4. A gyroscope as claimed in claim 1 in which each laminar spring is formed integral with its associated pair of mounting blocks.

5. A gyroscope as claimed in claim 2 in which a pair of mounting blocks carries a plurality of laminar springs.

6. A gyroscope as claimed in claim 5 in which each laminar spring is formed integral with its associated pair of mounting blocks.

7. A vibrating rotor gyroscope having an inertial mass located within a casing and having means for resiliently supporting the inertial mass for limited rotation about a required axis with respect to the casing comprising a first spring member including two laminar leaf springs and having a relatively massive mounting block, at opposite ends, said mounting blocks have matching surfaces parallel to one another and to the plane of the associated leaf springs, said mounting blocks being laterally displaced from one another, a second spring member including two laminar leaf springs and having a relatively massive mounting block at opposite ends, said mounting blocks of said second spring member having matching surfaces parallel to one another and perpendicular to the plane of the associated leaf springs, said mounting blocks of said second spring member being laterally displaced from one another, each of said two leaf springs of the first spring member being set-in from the edge of the associated mounting blocks, said two leaf springs of the second spring member being located adjacent to the edges of the associated mounting blocks and means for clamping the mounting blocks of the first spring member to the mounting blocks of the second spring member and to the inertial mass and the casing respectively such that the parallel matching surfaces on one side of the mounting blocks of the second spring member are in face to face contact with the parallel matching surfaces on one side of mounting blocks of the first spring member, and said two pairs of leaf springs being arranged to cross on a common axis about which the suspension is resilient.

8. A vibrating rotor gyroscope as set forth in claim 7 in which each laminar spring is integral with its associated mounting blocks.

9. A vibrating rotor gyroscope as set forth in claim 7 wherein said second spring member includes an opening between the two leaf springs and associated mounting blocks, said first spring member adapted to be positioned within said opening such that the set-in leaf springs are positioned adjacent the leaf springs of the second spring member.

References Cited

UNITED STATES PATENTS

| | | | |
|---|---|---|---|
| 2,793,028 | 5/1957 | Wheeler | 74—5 |
| 2,960,302 | 11/1960 | Brown | 74—5 X |
| 3,073,584 | 1/1963 | Troeger | 64—27 X |
| 3,264,880 | 8/1966 | Fischel | 74—5 |
| 3,382,726 | 5/1968 | Erdley | 74—5 UX |
| 3,413,858 | 12/1968 | Samet | 74—5 |
| 3,427,828 | 2/1969 | Stiles | 74—5 X |

MANUEL A. ANTONAKAS, Primary Examiner

U.S. Cl. X.R.

267—158